United States Patent
Osawa et al.

(10) Patent No.: US 10,069,440 B2
(45) Date of Patent: Sep. 4, 2018

(54) VIBRATOR AND ULTRASONIC MOTOR

(71) Applicant: CANON KABUSHIKI KAISHA, Tokyo (JP)

(72) Inventors: Kazuharu Osawa, Kawasaki (JP); Hitoshi Nishitani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 462 days.

(21) Appl. No.: 14/918,924

(22) Filed: Oct. 21, 2015

(65) Prior Publication Data
US 2016/0126449 A1     May 5, 2016

(30) Foreign Application Priority Data

Oct. 30, 2014   (JP) ................. 2014-221176

(51) Int. Cl.
| | | |
|---|---|---|
| *H02N 2/12* | (2006.01) | |
| *H01L 41/09* | (2006.01) | |
| *H02N 2/00* | (2006.01) | |
| *H02N 2/02* | (2006.01) | |

(52) U.S. Cl.
CPC ......... *H02N 2/0015* (2013.01); *H02N 2/0085* (2013.01); *H02N 2/026* (2013.01)

(58) Field of Classification Search
CPC ..... H02N 2/0015; H02N 2/0085; H02N 2/026
USPC ................................................. 310/348, 365
See application file for complete search history.

(56) References Cited

U.S. PATENT DOCUMENTS

| | | |
|---|---|---|
| 5,039,899 A | 8/1991 | Yamaguchi |
| 6,218,767 B1 | 4/2001 | Akada et al. |

FOREIGN PATENT DOCUMENTS

| | | |
|---|---|---|
| JP | 02-228266 A | 9/1990 |
| JP | 09-191670 A | 7/1997 |
| JP | 2009-124791 A | 6/2009 |
| JP | 2011-160525 A | 8/2011 |

OTHER PUBLICATIONS

Office Action dated Jul. 17, 2018, in Japanese Patent Application No. 2014-221176.

*Primary Examiner* — Thomas Dougherty
(74) *Attorney, Agent, or Firm* — Fitzpatrick, Cella, Harper & Scinto

(57) ABSTRACT

This invention prevents an adhesive portion between a piezoelectric element and a conducting member of a small vibrator from peeling off. In a vibrator, a conducting member includes at least one first adhesive portion adhered to an electrode, at least one second adhesive portion adhered to an elastic member, and a feed portion electrically connected to means for applying an external voltage. In the conducting member, a path length from the feed portion to the first adhesive portion is longer than a path length from the feed portion to the second adhesive portion.

16 Claims, 9 Drawing Sheets

VIBRATOR AND ULTRASONIC MOTOR

BACKGROUND OF THE INVENTION

Field of the Invention

The present invention relates to a vibrator that is the driving source of an ultrasonic motor used for a lens barrel or the like of an image capturing apparatus and an ultrasonic motor using the same.

Description of the Related Art

As the characteristic features of an ultrasonic motor using the ultrasonic vibration of a piezoelectric element, it can obtain a large driving force with a small body, cope with a wide speed range, and reduce the vibration and noise. Especially, as the characteristic features of a method using a chip type vibrator formed by bonding a piezoelectric element and an elastic member, the vibrator is relatively small, and a driven member can be not only rotatably driven but also linearly driven. For this reason, an ultrasonic motor using a chip type vibrator is suitable as an actuator for linearly driving a lens in the lens barrel or the like of a camera that needs a small motor with a large driving force. A device disclosed in Japanese Patent Application Laid-Open No. 2009-124791 is an example of an ultrasonic motor using a chip type vibrator.

In this method, a standing wave vibration is excited in the vibrator using expansion and contraction of the piezoelectric element when a voltage is applied to the piezoelectric element. The standing wave vibration excited in the vibrator is transmitted to the driven member, thereby driving the driven member. To drive the ultrasonic motor, it is necessary to apply a voltage to one or more pairs of electrodes provided on the piezoelectric element. Hence, the vibrator actually includes a conducting member as a line used to apply a voltage from an external feed means to the piezoelectric element.

In the vibrator described in Japanese Patent Application Laid-Open No. 2009-124791, one electrode of an electrode pair is extended to the same surface as the other electrode via a through hole, thereby gathering the plurality of electrodes to one surface. The conducting member is, for example, a flexible substrate, which is bonded to a wide surface on which the plurality of electrodes are gathered, thereby simultaneously supplying power from an external feed means to the plurality of electrodes. At this time, the adhesive portion between the piezoelectric element and the conducting member has a sufficiently large adhesive force because a large adhesion area can be obtained.

However, if one electrode is extended to the other electrode, as in the vibrator described in Japanese Patent Application Laid-Open No. 2009-124791, the region occupied by the extended electrode becomes an inactive region, and no driving force is generated. When the vibrator is downsized, the ratio of the inactive region increases, and a sufficient driving force cannot be obtained. For this reason, when downsizing the vibrator, it is necessary to adhere part of the conducting member to each of the plurality of electrodes on the piezoelectric element to attain conduction without extending the electrode so as not to form an inactive region. Additionally, in the vibrator described in Japanese Patent Application Laid-Open No. 2009-124791, one electrode is covered with an elastic member. Hence, conduction to the electrode covered with the elastic member needs to be attained via the elastic member.

In the small chip type vibrator as described above, it is difficult to obtain a sufficiently large adhesion area in the adhesive portion because the surface area of the vibrator is small. In addition, since the electrodes on the piezoelectric element are very thin, it is also difficult to perform a process of increasing the adhesive force by, for example, roughening the surface. Hence, when the adhesion area is small, a sufficiently large adhesive force cannot be obtained in the adhesive portion between the piezoelectric element and the conducting member. Under these circumstances, if an unintended large external force is generated in the conducting member upon assembling the ultrasonic motor, a force more than the adhesive force may act on the adhesive portion between the piezoelectric element and the conducting member, and the conducting member may peel off.

SUMMARY OF THE INVENTION

The present invention has been made with the above-described technical background and enables to provide a small vibrator in which a conducting member hardly peels off.

In order to solve the above-described problem, according to the present invention, there is provided a vibrator comprising a piezoelectric element including a plurality of electrodes and configured to expand and contract when a voltage is applied, an elastic member having conductivity and configured to come into contact with the piezoelectric element and be vibrated by the expansion and contraction of the piezoelectric element, and a conducting member configured to apply the voltage to the piezoelectric element from outside, wherein the conducting member comprises at least one first adhesive portion adhered to an electrode, at least one second adhesive portion adhered to the elastic member, and a feed portion electrically connected to means for applying the external voltage, and in the conducting member, a path length from the feed portion to the first adhesive portion is longer than a path length from the feed portion to the second adhesive portion.

In order to solve the above-described problem, according to the present invention, there is also provided a vibrator comprising a piezoelectric element including a plurality of electrodes and configured to expand and contract when a voltage is applied, an elastic member having conductivity and configured to come into contact with the piezoelectric element and be vibrated by the expansion and contraction of the piezoelectric element, and a conducting member configured to apply the voltage to the piezoelectric element from outside, wherein the conducting member comprises at least one first adhesive portion adhered to an electrode, at least one second adhesive portion adhered to the elastic member, and a feed portion electrically connected to means for applying the external voltage, and in the conducting member, a path from the feed portion to the first adhesive portion has at least one bending portion, and a path from the feed portion to the second adhesive portion is substantially straight.

According to the present invention, it is possible to provide a small vibrator in which a conducting member hardly peels off.

Further features of the present invention will become apparent from the following description of exemplary embodiments with reference to the attached drawings.

BRIEF DESCRIPTION OF THE DRAWINGS

FIGS. 1A, 1B and 1C are diagrams illustrating a vibrator 1 according to the first embodiment of the present invention, in which FIG. 1A is a plan view, FIG. 1B is a front view, and FIG. 1C is a bottom view.

FIGS. 2A, 2B and 2C are diagrams illustrating the behavior of the vibration of the vibrator 1 according to the first embodiment of the present invention, in which FIG. 2A illustrates a reciprocating motion in the x direction, FIG. 2B illustrates a reciprocating motion in the z direction, and FIG. 2C illustrates a vibration that combines the reciprocating motions in the x and z directions.

FIGS. 7A, 7B and 7C are diagrams illustrating a vibrator 2 according to the second embodiment of the present invention, in which FIG. 7A is a plan view, FIG. 7B is a front view, and FIG. 7C is a bottom view.

FIGS. 8A, 8B and 8C are diagrams illustrating the behavior of the vibration of the vibrator 2 according to the second embodiment of the present invention, in which FIG. 8A illustrates a reciprocating motion in the x direction, FIG. 8B illustrates a reciprocating motion in the z direction, and FIG. 8C illustrates a vibration that combines the reciprocating motions in the x and z directions.

FIGS. 11A, 11B and 11C are diagrams for explaining the effects of the second embodiment of the present invention, in which FIG. 11A is a plan view, FIG. 11B is a front view, and FIG. 11C is a bottom view.

DESCRIPTION OF THE EMBODIMENTS

Preferred embodiments of the present invention will now be described in detail in accordance with the accompanying drawings.

Embodiments of the present invention will be described below. A vibrator 1 according to the first embodiment of the present invention will be described first.

First Embodiment

Figure 1A:
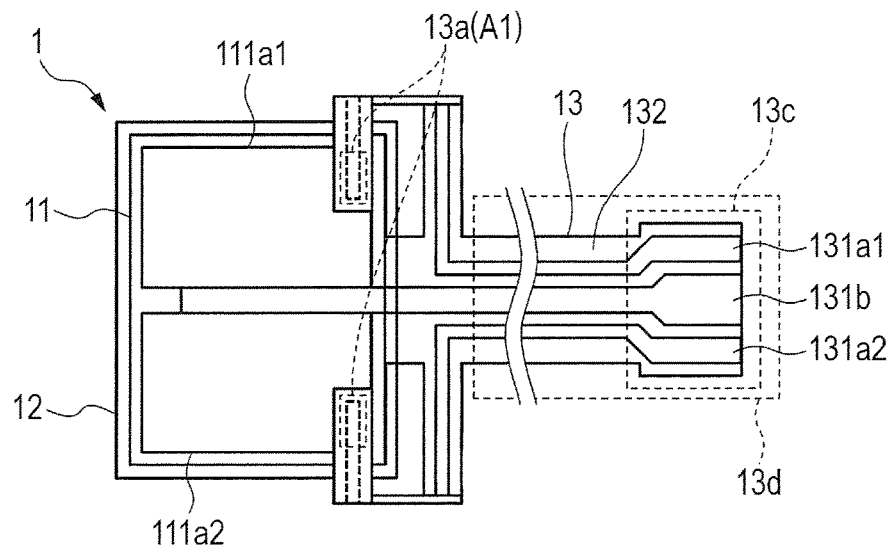
Figure 1B:
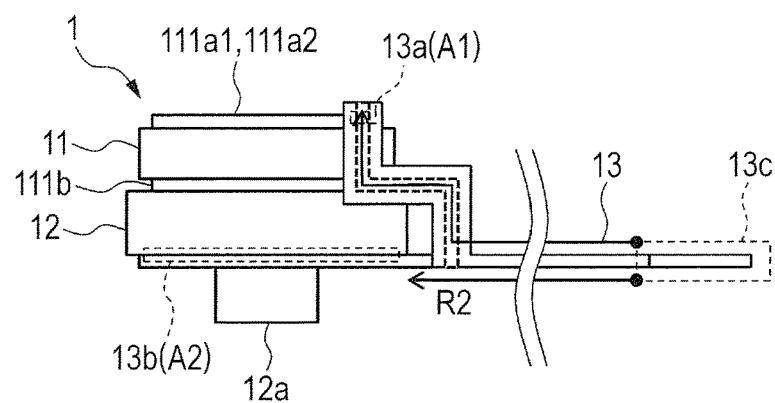
Figure 1C:
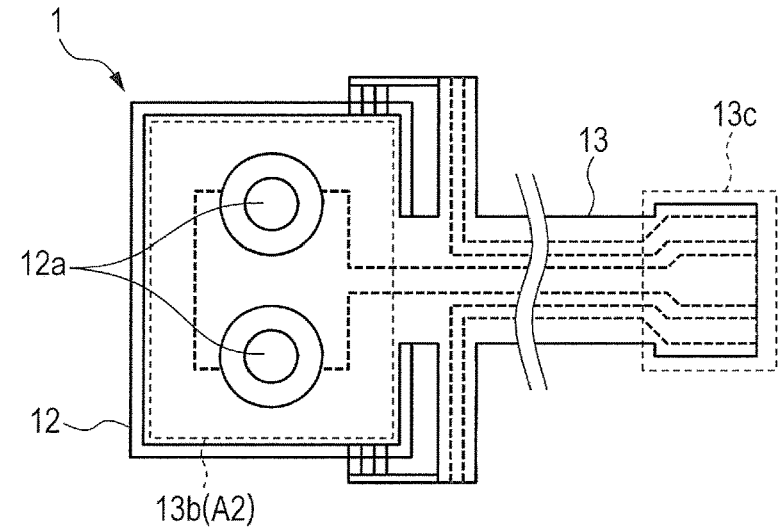

FIGS. 1A to 1C are diagrams illustrating the vibrator 1 according to the first embodiment of the present invention. FIGS. 1A to 1C respectively illustrate a plan view, a front view, and a bottom view of the vibrator 1. The vibrator 1 is formed from a piezoelectric element 11, an elastic member 12, and a conducting member 13.

The piezoelectric element 11 is, for example, a plate-shaped member and uses a piezoelectric material such as PZT (lead zirconate titanate) as the material. Electrodes 111a1 and 111a2 are provided on the upper surface of the piezoelectric element 11 so as to divide the upper surface of the piezoelectric element 11 into two parts. An electrode 111b is provided on the bottom surface of the piezoelectric element 11 so as to cover the entire bottom surface. For example, when AC voltages are applied between the electrode 111a1 and the electrode 111b and between the electrode 111a2 and the electrode 111b, the piezoelectric element 11 expands and contracts. The electrodes 111a1, 111a2 and 111b are, for example, silver electrodes, which are formed on the surfaces of the piezoelectric element 11 by applying a silver paste using a method such as screen printing and then sintering the paste.

The elastic member 12 is, for example, a plate-shaped member and uses a conductive material such as stainless steel as the material. The elastic member 12 is adhered to the surface of the piezoelectric element 11 with the electrode 111b, and vibrates as the piezoelectric element 11 expands and contracts. The electrode 111b of the piezoelectric element 11 is covered with the elastic member 12. Hence, to apply a desired voltage to the electrode 111b, the voltage is applied via the elastic member 12. Projecting portions 12a are provided on the elastic member 12 by press working or by adhering separate members. When AC voltages having an appropriate phase difference are applied between the electrode 111a1 and the electrode 111b and between the electrode 111a2 and the electrode 111b, a plurality of standing wave vibrations are excited in the piezoelectric element 11 and the elastic member 12, and the distal ends of the projecting portions 12a make an elliptic motion. Details of the vibrations of the piezoelectric element 11 and the elastic member 12 will be described later.

The conducting member 13 is, for example, a flexible substrate and is formed from conducting lines 131a1, 131a2, 131b that are conductive with the electrodes 111a1, 111a2, and 111b, respectively, and an insulator 132 that covers the conducting lines. The conducting member 13 is provided with at least one first adhesive portion 13a adhered to each of the electrodes 111a1 and 111a2 and having an adhesion area A1 surrounded by a dotted line on the piezoelectric element 11 illustrated in FIG. 1A. In addition, the conducting member 13 is provided with one second adhesive portion 13b adhered to the elastic member 12 and having an adhesion area A2 surrounded by a dotted line on the elastic member 12 illustrated in FIG. 1C. That is, the second adhesive portion 13b is provided on the surface opposite to the surface in contact with the piezoelectric element 11 when viewed from the elastic member 12. Furthermore, the conducting member 13 is provided with a feed portion 13c electrically connected to an external feed means. The conducting lines 131a1, 131a2, 131b of the conducting member 13 are exposed to the surfaces only on the adhesive surface of the first adhesive portion 13a, the adhesive surface of the second adhesive portion 13b and the feed portion 13c. For this reason, the conducting lines 131a1 and 131a2 are conductive with the electrodes 111a1 and 111a2, respectively, via the adhesive surfaces of the first adhesive portions 13a. Since the adhesive surface of the second adhesive portion 13b is adhered to the elastic member 12, the conducting line 131b is conductive with the elastic member 12 and indirectly conductive with the electrode 111b via the elastic member 12.

Figure 2A:
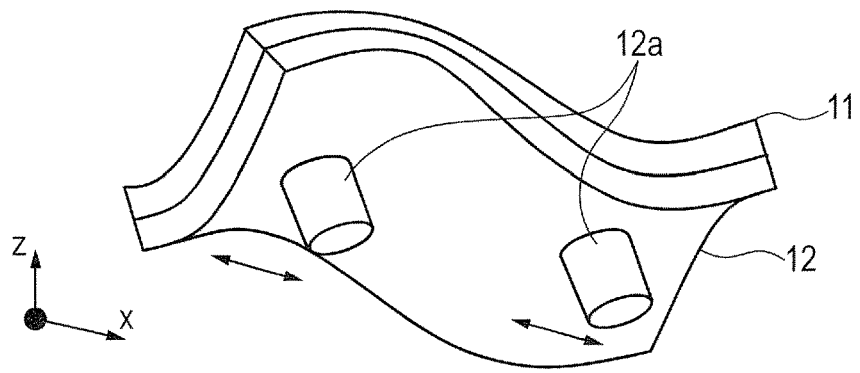
Figure 2B:
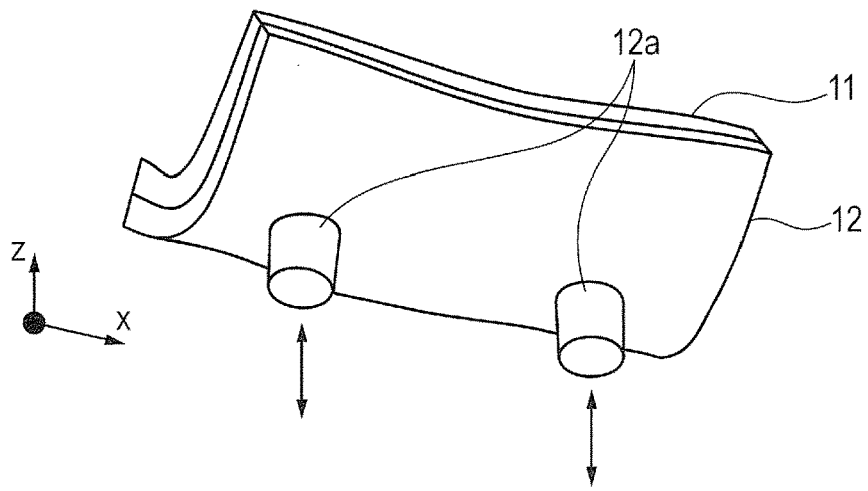
Figure 2C:
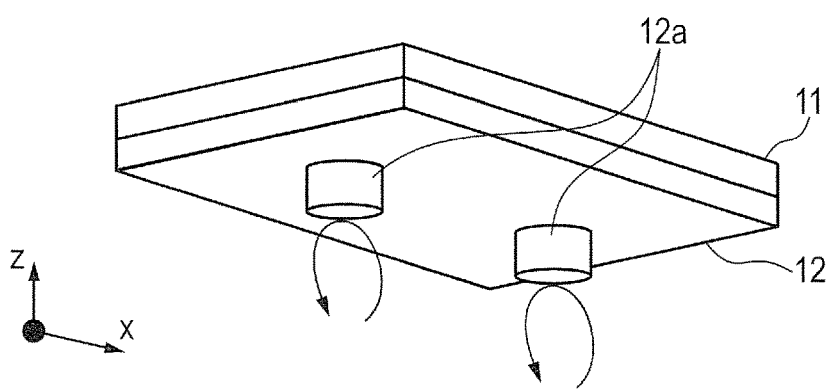

The vibrations of the piezoelectric element 11 and the elastic member 12 will be described here. FIGS. 2A and 2B are diagrams illustrating the behaviors of standing wave vibrations excited by the piezoelectric element 11 and the elastic member 12. In the vibration illustrated in FIG. 2A, the projecting portions 12a make a reciprocating motion in the long side direction (x direction in FIG. 2A) of the piezoelectric element 11 and the elastic member 12. In the vibration illustrated in FIG. 2B, the projecting portions 12a make a reciprocating motion in the thickness direction (z direction in FIG. 2B) of the piezoelectric element 11 and the elastic member 12. When the reciprocating motions illustrated in FIGS. 2A and 2B are combined, an elliptic motion as illustrated in FIG. 2C can be caused in the projecting portions 12a. When the projecting portions 12a are brought into contact with a driving target by an appropriate press force, and the above-described elliptic motion is caused, the driving target can be driven.

Figure 3:
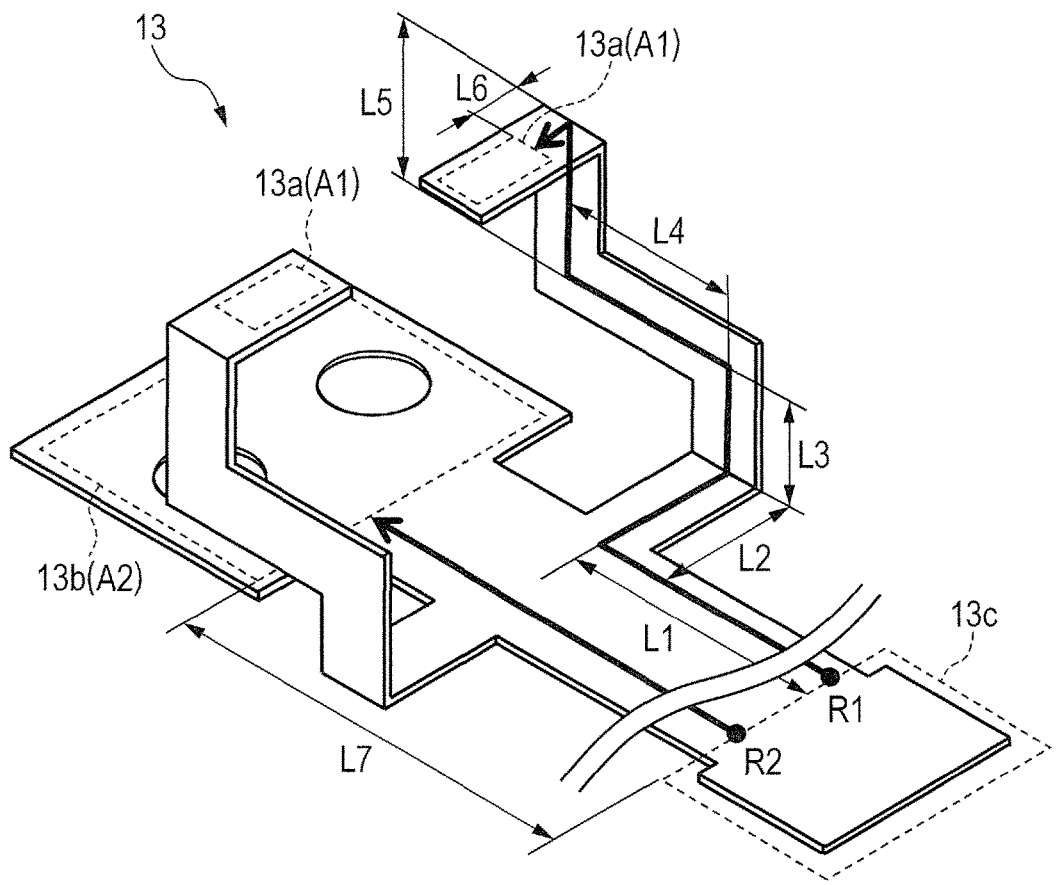
FIG. 3 is a perspective view of a conducting member 13 of the vibrator 1 according to the first embodiment of the present invention.

The characteristic features of the vibrator 1 will be described next with reference to FIG. 3. FIG. 3 is a perspective view of the conducting member 13 of the vibrator 1. As a characteristic feature of the vibrator 1 according to the present invention, the length (distance represented by R1 in FIG. 3) of a path that connects the feed portion 13c and the first adhesive portion 13a of the conducting member 13 is longer than the length (distance represented by R2 in FIG. 3) of a path that connects the feed portion 13c and the second adhesive portion 13b. Note that the above-described paths are the shortest paths in a region including only the conducting lines 131a1, 131a2, and 131b and the insulator 132. In the conducting member 13 of the vibrator 1, the length of the path R1 is the sum of lengths L1, L2, L3, L4, L5 and L6 in FIG. 3, and the length of the path R2 is a length L7 in FIG. 3.

As another characteristic feature of the vibrator 1 according to the present invention, the path R1 from the feed portion 13c to the first adhesive portion 13a in the conducting member 13 has at least one bending portion, and the path R2 from the feed portion 13c to the second adhesive portion 13b is almost straight. Referring to FIG. 3, the path R1 has a bending portion in the portions of the lengths L1 and L2 which form part of the path R1. Bending portions are also formed in the portions of the lengths L2 and L3, the portions of the lengths L3 and L4, the portions of the lengths L4 and L5, and the portions of the lengths L5 and L6. On the other hand, the path R2 is formed almost straight.

The functions and effects of this embodiment will be described below. For example, when assembling the vibrator 1 in an ultrasonic motor, an unintended external force is assumed to act on a portion 13d (FIG. 1A) largely extending from the piezoelectric element 11 and the elastic member 12 out of the conducting member 13. At this time, if the force acting on each adhesive portion exceeds the adhesive force of the adhesive portion, the conducting member 13 peels off. Particularly in a case where the vibrator 1 is small, since the areas of the first adhesive portion 13a and the second adhesive portion 13b are limited to small areas, the adhesive force lowers, and the above problem conspicuously arises. Regardless of the small area, the second adhesive portion 13b can easily obtain a large adhesive force using a method of, for example, roughening the surface of the elastic member. However, the first adhesive portion 13a cannot use a method of, for example, roughening the surface of the thin electrode layer, and can hardly obtain a large adhesive force. For this reason, the first adhesive portion 13a readily peels off, as compared to the second adhesive portion 13b.

Figure 4:
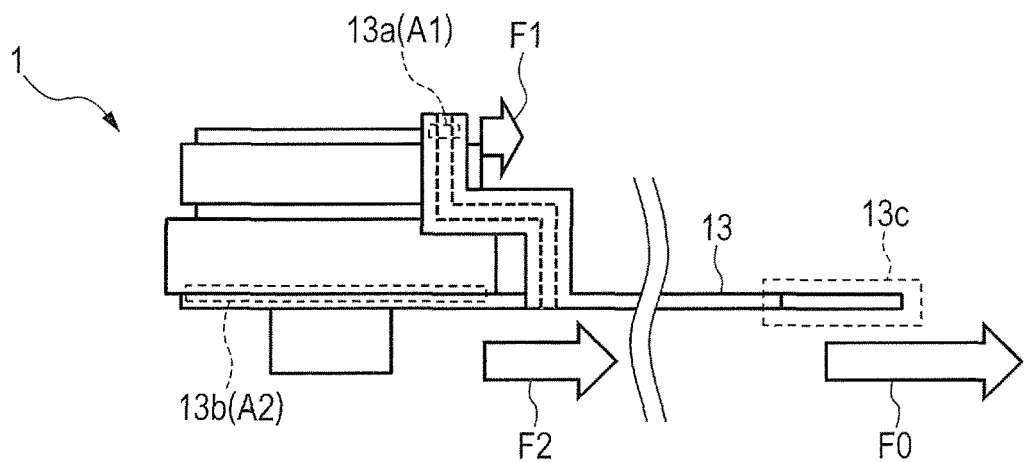
FIG. 4 is a diagram illustrating forces acting on the conducting member 13 of the vibrator 1 according to the first embodiment of the present invention.

FIG. 4 is a diagram illustrating forces acting on the first adhesive portion 13a and the second adhesive portion 13b when an external force acts on the conducting member 13. As illustrated in FIG. 4, when a force F0 acts on the feed portion 13c, forces F1 and F2 are generated in the first adhesive portion 13a and the second adhesive portion 13b, respectively. In the vibrator 1 according to the present invention, the length (R1 in FIG. 3) of the path that connects the feed portion 13c and the first adhesive portion 13a of the conducting member 13 is longer than the length (R2 in FIG. 3) of the path that connects the feed portion 13c and the second adhesive portion 13b. In addition, since the second adhesive portion 13b is arranged closer to the feed portion 13c than the first adhesive portion 13a, most part of the force F0 acting on the feed portion 13c acts on the second adhesive portion 13b closer to the feed portion 13c than the first adhesive portion 13a (F2 in FIG. 4).

In addition, since the path R2 is almost straight, the second adhesive portion 13b can directly receive the force F2 corresponding to the force F0 acting on the feed portion 13c. On the other hand, since the bending portions are provided on the path R1, the force F0 acting on the feed portion 13c is weakened as the direction of the acting force is changed, and the weakened force acts on the first adhesive portion 13a.

The force acting on the first adhesive portion 13a is thus largely reduced (F1 in FIG. 4). With the above-described function, in the vibrator 1 according to the present invention, both the first adhesive portion 13a and the second adhesive portion 13b hardly peel off. It is therefore possible to provide a small vibrator in which the conducting member hardly peels off. Additionally, since most part of an external force acts on the second adhesive portion 13b, as described above, the conducting member hardly peels off even for a larger external force as the adhesive force of the second adhesive portion 13b is increased.

In the vibrator 1, the adhesion area A2 of the second adhesive portion 13b is preferably made larger than the adhesion area A1 of the first adhesive portion 13a. When the adhesion area A2 is made large, the adhesive force of the second adhesive portion 13b can be further increased, and a larger effect of preventing peeling can be obtained.

As for the conducting member 13 of the vibrator 1, any material having both flexibility and conductivity, for example, a copper wire or enameled wire can be used to obtain the effects of the present invention. However, a flexible substrate having both flexibility and conductivity can attain conduction to a plurality of electrodes by one line, and is advantageous in reducing the cost if conduction to a plurality of electrodes needs to be obtained, like the vibrator 1. Hence, the conducting member 13 preferably uses a flexible substrate.

In the vibrator 1, the conducting member 13, the electrodes 111a1 and 111a2, and the piezoelectric element 11 are conductive via the two first adhesive portions 13a, and the elastic member 12, the electrode 111b, and the piezoelectric element 11 are conductive via the second adhesive portion 13b. At this time, a conductive paste or the like is used as the adhesive used for the adhesive portions. Hence, adhesion and electrical connection can simultaneously be attained.

Figure 5:
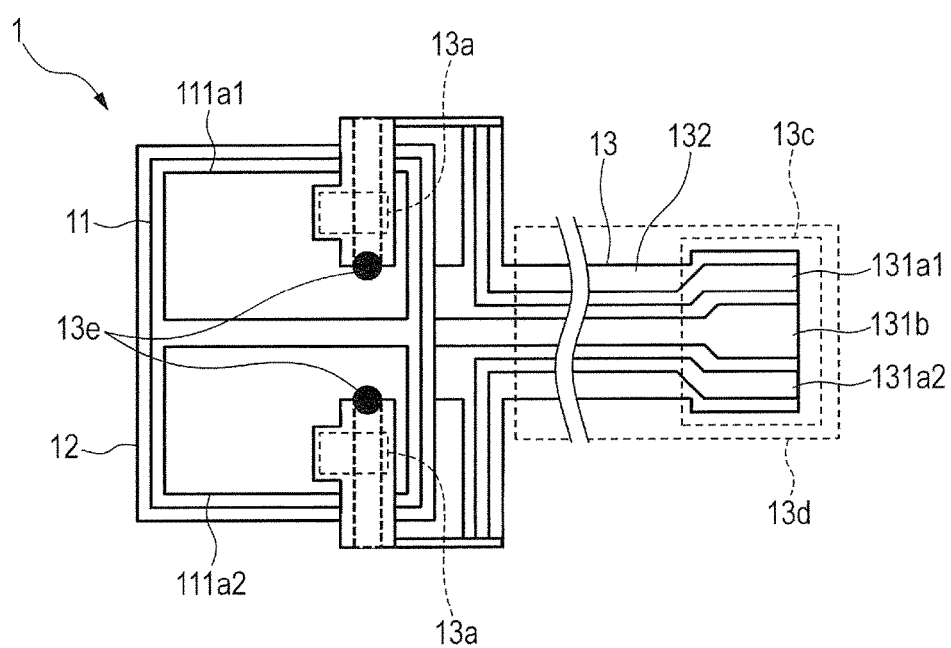
FIG. 5 is a diagram for explaining the effects of the first embodiment of the present invention.

FIG. 5 is a plan view of the vibrator 1, which illustrates an example in which in the first adhesive portions 13a, the conducting lines 131a1 and 131a2 and the electrodes 111a1 and 111a2 are not rendered conductive, and conducting portions 13e conductive with the electrodes are separately provided. Conduction between the conducting portions 13e and the piezoelectric element 11 is obtained by, for example, soldering. In the arrangement illustrated in FIG. 5, since the adhesive portions and the conducting portions are separately provided, an adhesion step and a soldering step need to be performed independently, resulting in a high cost. On the other hand, when the conducting member 13 is conductive with the piezoelectric element 11 via the first adhesive portions 13a, as in the first embodiment of the present invention, the cost can be reduced by simplifying the adhesion step.

Figure 6A:
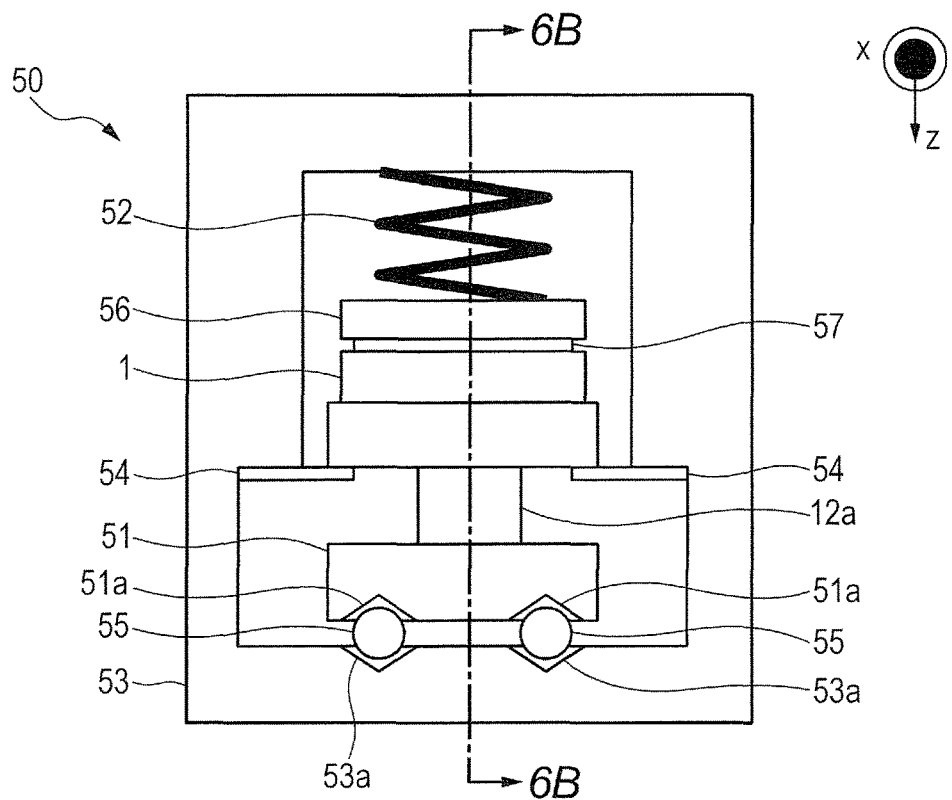
FIG. 6A is a diagram illustrating an ultrasonic motor 50 using the vibrator 1 according to the first embodiment of the present invention.
Figure 6B:
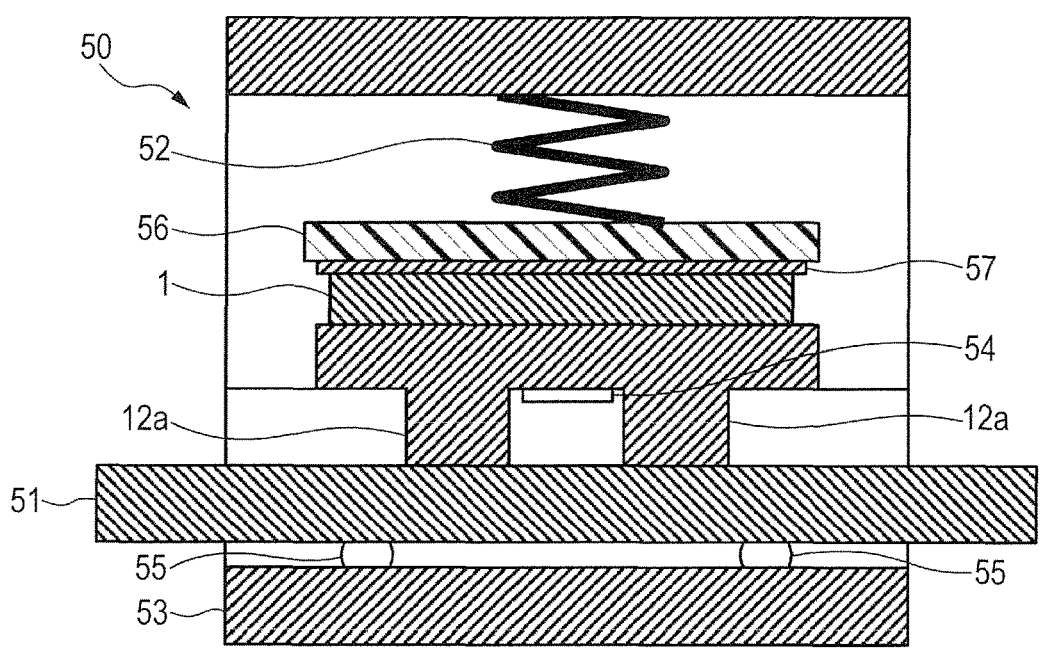
FIG. 6B is a sectional view.

An ultrasonic motor 50 using the vibrator 1 according to the present invention will be described below. FIG. 6A is a front view of the ultrasonic motor 50 according to the present invention. FIG. 6B is a sectional view taken along a line 6B-6B in FIG. 6A. The ultrasonic motor 50 is formed from the above-described vibrator 1, a driven member 51, a press member 52, a base member 53, a holding member 54, rolling members 55, a press plate 56, and a buffer member 57. The conducting member 13 of the vibrator 1 is not illustrated for the sake of simplicity. The projecting portions 12a of the vibrator 1 according to the present invention are brought into contact with the driven member 51 as a driving target by a press force generated by the press member 52. For example, the driven member 51 is a square bar made of stainless steel, and the press member 52 is a conical coil spring. The driven member 51 is provided with groove portions 51a. The base member 53 that covers the vibrator 1 and the driven member is also provided with groove portions 53a. When the rolling members 55 are sandwiched between the groove portions 53a and the groove portions 51a provided in the driven member 51, the driven member 51 and the base member are held so as to be relatively movable in the x direction in FIG. 6A. The vibrator 1 and the base member 53 are connected via the holding member 54.

The holding member 54 is, for example, a thin metal plate which has a low rigidity in the press direction (z direction in FIG. 6A) of the press member 52 but a high rigidity in the relative movement direction (x direction in FIG. 6A) of the vibrator 1 and the driven member. It is therefore possible to hold the vibrator 1 while suppressing the influence on the press force generated by the press member 52. If the press member 52 directly presses the vibrator 1, the vibration of the vibrator 1 may be impeded. Hence, the press plate 56 and the buffer member 57 are arranged between the press member 52 and the vibrator 1. For example, a resin plate member is used as the press plate 56, and a felt sheet member is used as the buffer member 57.

In the above-described arrangement, when the elliptic motion illustrated in FIG. 2C is caused in the projecting portions 12a of the vibrator 1, the driven member 51 is driven to be repetitively fed in the x direction in FIG. 6A. The ultrasonic motor 50 can drive the driving target by fixing the base member 53 and connecting the driven member 51 to the driving target or by connecting the base member 53 to the driving target and fixing the driven member 51.

The functions and effects of the ultrasonic motor 50 using the vibrator 1 according to the first embodiment will be described below. The ultrasonic motor 50 according to the present invention includes the above-described vibrator 1, the driven member 51 to be relatively driven by the vibration of the vibrator 1, and the press member 52 that brings the projecting portions 12a of the vibrator 1 into contact with the driven member 51. During driving of the ultrasonic motor 50, probably, the conducting member 13 of the vibrator 1 deforms, and a force is generated in the conducting member 13. However, the ultrasonic motor 50 of high reliability can be provided by using the vibrator 1 in which the conducting member 13 hardly peels off.

Second Embodiment

Figure 7A:
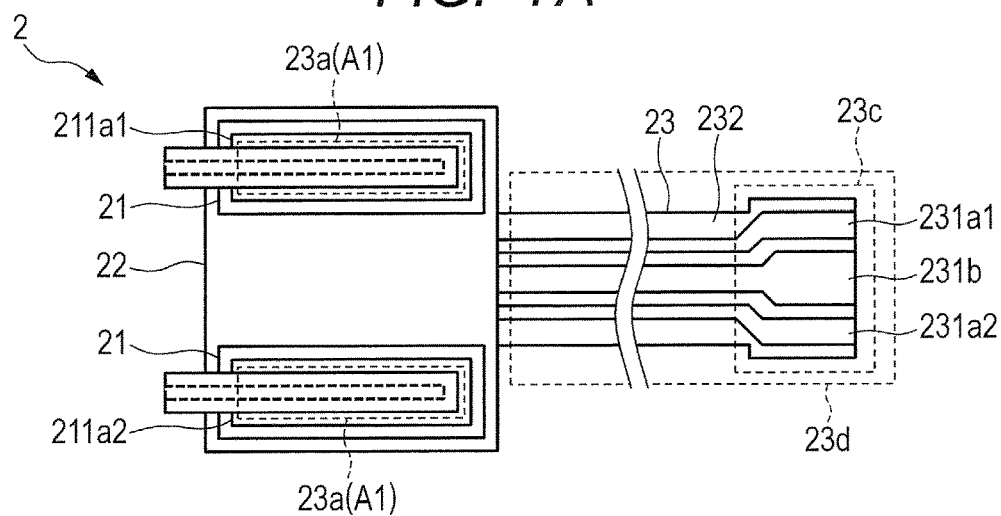
Figure 7B:
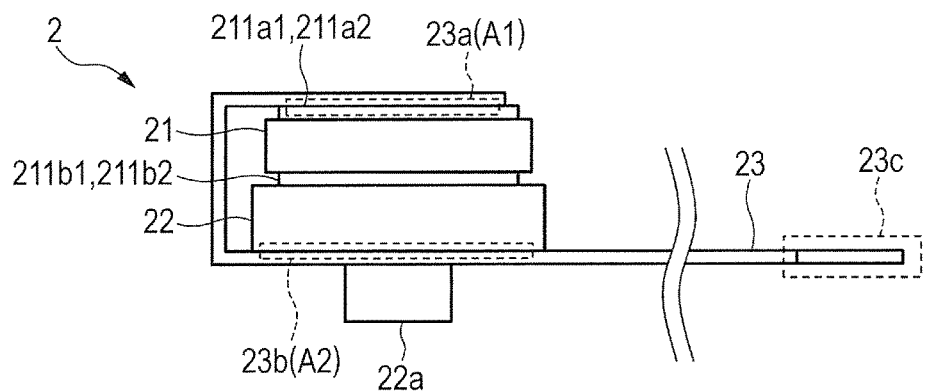
Figure 7C:
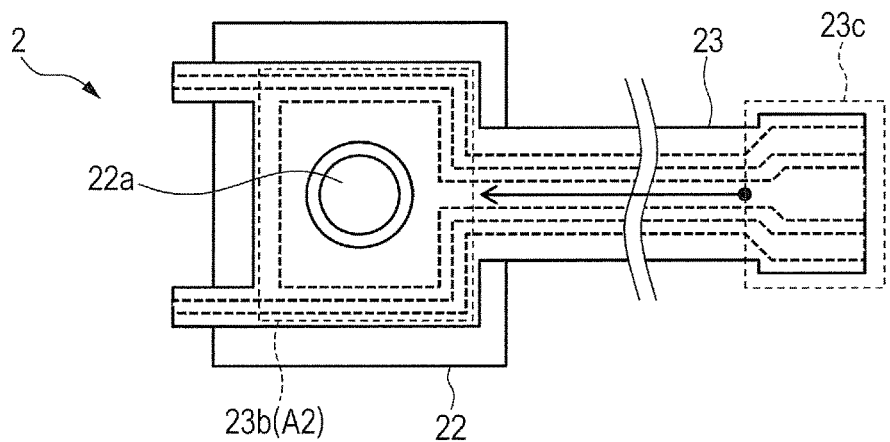

FIGS. 7A to 7C are diagrams illustrating a vibrator 2 according to the second embodiment of the present invention. FIGS. 7A to 7C respectively illustrate a plan view, a front view, and a bottom view of the vibrator 2. The vibrator 2 is formed from a piezoelectric element 21, an elastic member 22, and a conducting member 23.

The material of the piezoelectric element 21 is the same as that of the piezoelectric element 11 according to the first embodiment. The vibrator 2 uses two piezoelectric elements 21. A combination of electrodes 211a1 and 211b1 and a combination of electrodes 211a2 and 211b2 are provided in the same shape on the obverse and reverse surfaces of the piezoelectric elements 21. When AC voltages are applied between the electrode 211a1 and the electrode 211b1 and between the electrode 211a2 and the electrode 211b2, the piezoelectric elements 21 expand and contract. The material of the electrodes 211a1, 211a2, 211b1, and 211b2 is the same as that of the electrodes 111a and the like according to the first embodiment.

The material of the elastic member 22 and a projecting portion 22a provided on the elastic member 22 are the same as in the elastic member 12 according to the first embodiment. The elastic member 22 is adhered to the surfaces of the piezoelectric elements 21 with the electrodes 211b1 and 211b2, and vibrates as the piezoelectric elements 21 expand and contract. Voltages are indirectly applied to the electrodes 211b1 and 211b2 by applying the voltages via the elastic member 22, as in the first embodiment. When AC voltages having an appropriate phase difference are applied between the electrode 211a1 and the electrode 211b1 and between the electrode 211a2 and the electrode 211b2, a plurality of standing wave vibrations are excited in the piezoelectric elements 21 and the elastic member 22, and the distal end of the projecting portion 22a makes an elliptic motion. Details of the vibrations of the piezoelectric elements 21 and the elastic member 22 will be described later.

The major components of the conducting member 23 are the same as those of the conducting member 13 according to the first embodiment. The conducting member 23 is provided with two first adhesive portions 23a adhered to the piezoelectric elements 21, and one second adhesive portion 23b adhered to the elastic member 22. In addition, the conducting member 23 is provided with a feed portion 23c electrically connected to an external feed means. In the first adhesive portion 23a, conducting lines 231a1 and 231a2 of the conducting member 23 are exposed to the surface. On the adhesive surface of the second adhesive portion 23b, a conducting line 231b of the conducting member 23 is exposed to the surface. In the feed portion 23c, the conducting lines 231a1, 231a2, and 231b are exposed to the surface. For this reason, the conducting lines 231a1 and 231a2 are conductive with the electrodes 211a1 and 211a2 via the adhesive surfaces. The conducting line 231b is conductive with the elastic member 22 and indirectly conductive with the electrodes 211b1 and 211b2. Note that let A1 be the adhesion area of the first adhesive portion 23a, and A2 be the adhesion area of the second adhesive portion 23b.

Figure 8A:
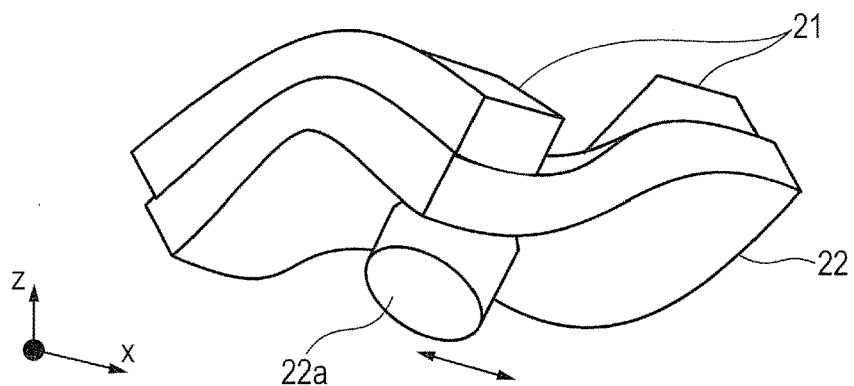
Figure 8B:
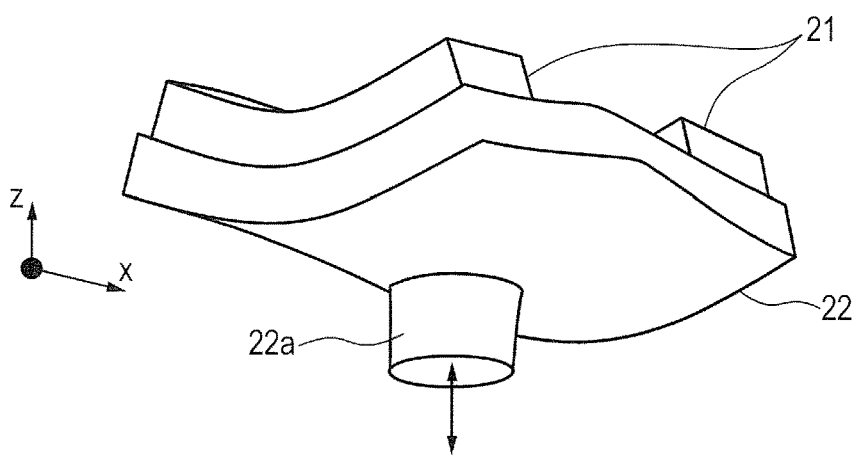
Figure 8C:
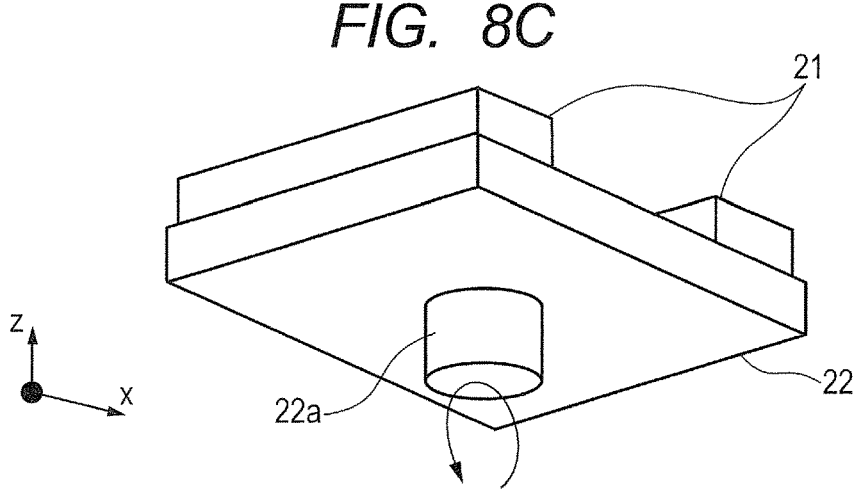

The vibrations of the piezoelectric elements 21 and the elastic member 22 will be described here. FIGS. 8A and 8B are diagrams illustrating the behaviors of standing wave vibrations excited by the piezoelectric elements 21 and the elastic member 22. In the vibration illustrated in FIG. 8A, the projecting portion 22a makes a reciprocating motion in the long side direction (x direction in FIG. 8A) of the piezoelectric elements 21 and the elastic member 22. In the vibration illustrated in FIG. 8B, the projecting portion 22a makes a reciprocating motion in the thickness direction (z direction in FIG. 8B) of the piezoelectric elements 21 and the elastic member 22. When the reciprocating motions illustrated in FIGS. 8A and 8B are combined, an elliptic motion as illustrated in FIG. 8C can be caused in the projecting portion 22a. When the projecting portion 22a is brought into contact with a driving target by an appropriate press force, and the above-described elliptic motion is caused, the driving target can be driven.

In general, when the vibrator is simply downsized, the resonance frequency becomes high, and no vibration amplitude can be obtained.

However, when a plurality of piezoelectric elements 21 is used, as in the vibrator 2, the bending rigidity of the vibrator 2 can be lowered. As a result, the resonance frequency can be lowered, and a large vibration amplitude can be obtained.

Figure 9:
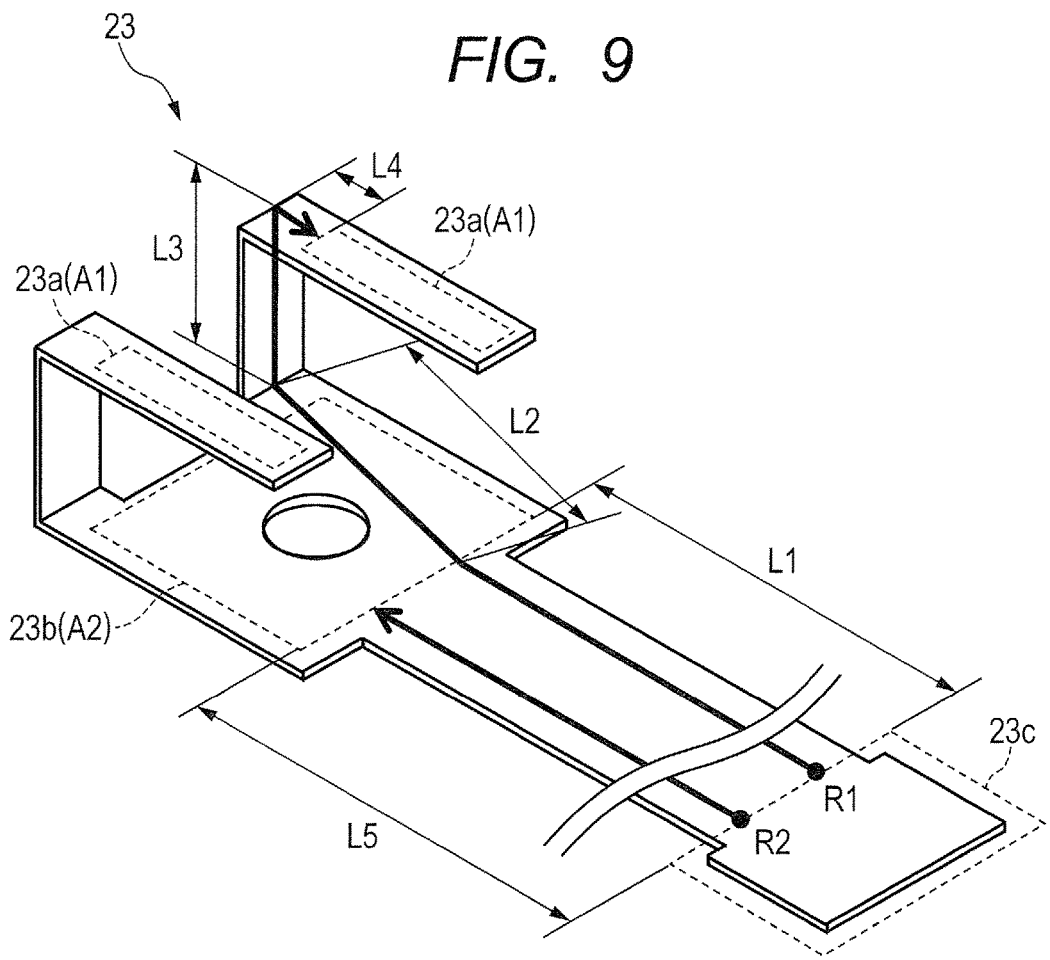
FIG. 9 is a perspective view of a conducting member 23 of the vibrator 2 according to the second embodiment of the present invention.

The characteristic features of the vibrator 2 will be described with reference to FIG. 9. FIG. 9 is a perspective view of the conducting member 23 of the vibrator 2. As a characteristic feature of the vibrator 2 according to the present invention, the length (distance represented by R1 in FIG. 9) of a path that connects the feed portion 23c and the first adhesive portion 23a of the conducting member 23 is longer than the length (distance represented by R2 in FIG. 9) of a path that connects the feed portion 23c and the second adhesive portion 23b. In addition, the second adhesive portion 23b is arranged between the feed portion 23c and the first adhesive portion 23a. That is, the second adhesive portion 23b is arranged on the path (R1 in FIG. 9) that connects the feed portion 23c and the first adhesive portion 23a. Note that the above-described paths are the shortest paths in a region including only the conducting lines 231a1, 231a2, and 231b and an insulator 232. In the conducting member 23 of the vibrator 2, the length of the path R1 is the sum of lengths L1, L2, L3, and L4 in FIG. 9, and the length of the path R2 is a length L5 in FIG. 9.

As another characteristic feature of the vibrator 2 according to the present invention, the path R1 from the feed portion 23c to the first adhesive portion 23a in the conducting member 23 has at least one bending portion, and the path R2 from the feed portion 23c to the second adhesive portion 23b is almost straight. Referring to FIG. 9, the path R1 has a bending portion in the portions of the lengths L1 and L2 which form part of the path R1. Bending portions are also formed in the portions of the lengths L2 and L3 and the portions of the lengths L3 and L4. On the other hand, the path R2 is formed almost straight.

Figure 10:
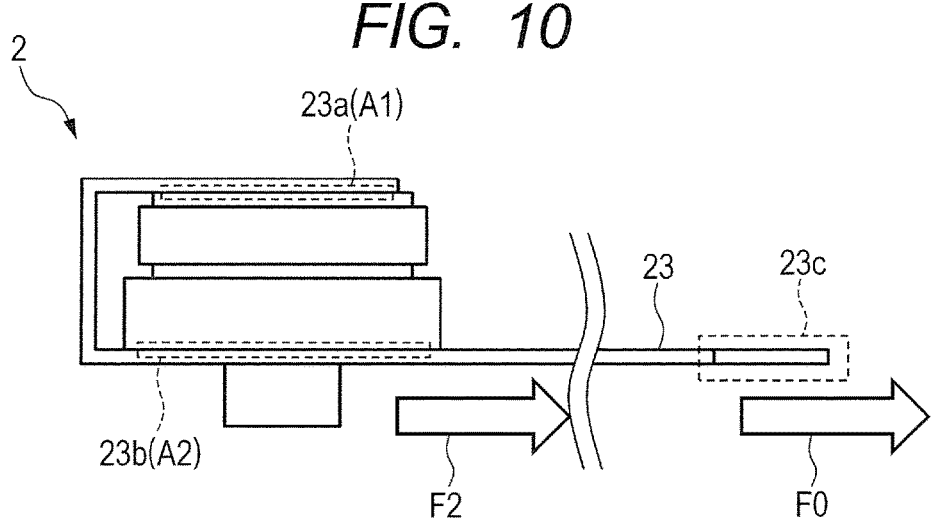
FIG. 10 is a diagram illustrating forces acting on the conducting member 23 of the vibrator 2 according to the second embodiment of the present invention.

The functions and effects of the vibrator 2 according to the present invention will be described below. As described concerning the explanation of the vibrator 1, in the vibrator 2 as well, the first adhesive portion 23a readily peels off, as compared to the second adhesive portion 23b. If the conducting member deforms, peeling of the first adhesive portion 23a poses a problem. FIG. 10 is a diagram illustrating forces acting on the first adhesive portion 23a and the second adhesive portion 23b when an external force acts on the conducting member 23. As illustrated in FIG. 10, a force F0 acts on the feed portion 23c. Since the second adhesive portion 23b is arranged on the path that connects the feed portion 23c and the first adhesive portion 23a, the force is not transmitted to the first adhesive portion 23a, and a force F2 is generated only in the second adhesive portion 23b. For this reason, no force is generated in the first adhesive portion 23a, and peeling hardly occurs. Although the force F2 is generated in the second adhesive portion 23b, the possibility that peeling occurs is sufficiently low because the adhesive force of the second adhesive portion 23b is strong, as described in the first embodiment.

With the above-described function, in the vibrator 2 according to the present invention, both the first adhesive portion 23a and the second adhesive portion 23b hardly peel off. It is therefore possible to provide a small vibrator in which the conducting member hardly peels off. Additionally, when the second adhesive portion 23b is arranged between the feed portion 23c and the first adhesive portion 23a on the path R1 that connects the feed portion 23c and the first adhesive portion 23a, no force acts on the first adhesive portion 23a, and a conspicuous effect of preventing peeling of the conducting member 23 can be obtained.

The vibrator 2 according to the present invention includes two piezoelectric elements 21 to lower the resonance frequency and obtain a large amplitude, as described above. When a plurality of piezoelectric elements is provided, the surface area of each piezoelectric element 21 becomes very small, and the adhesive force of the first adhesive portion 23a lowers. However, in the arrangement according to the present invention, the force that acts to peel the first adhesive portion can be eliminated.

Figure 11A:
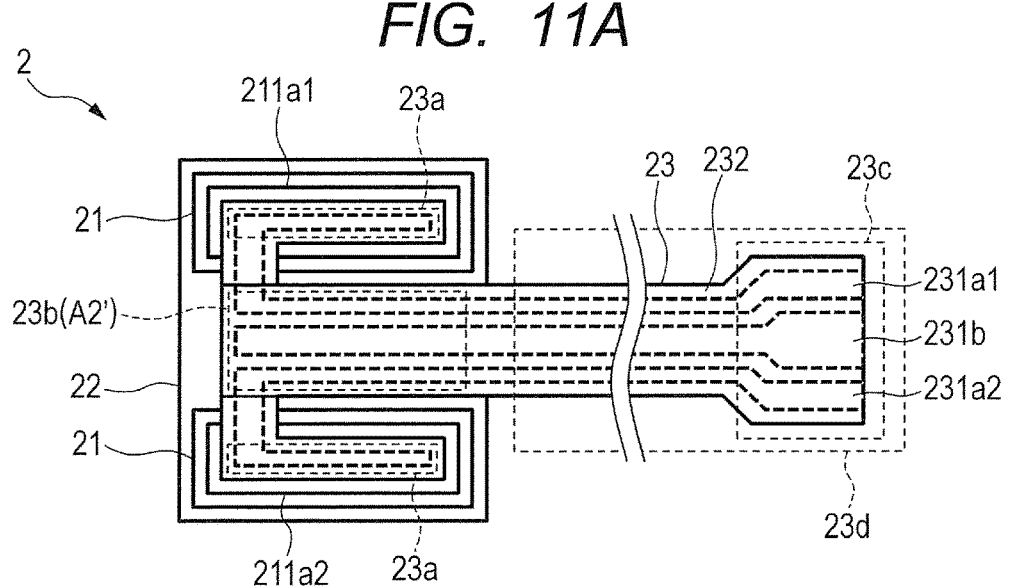
Figure 11B:
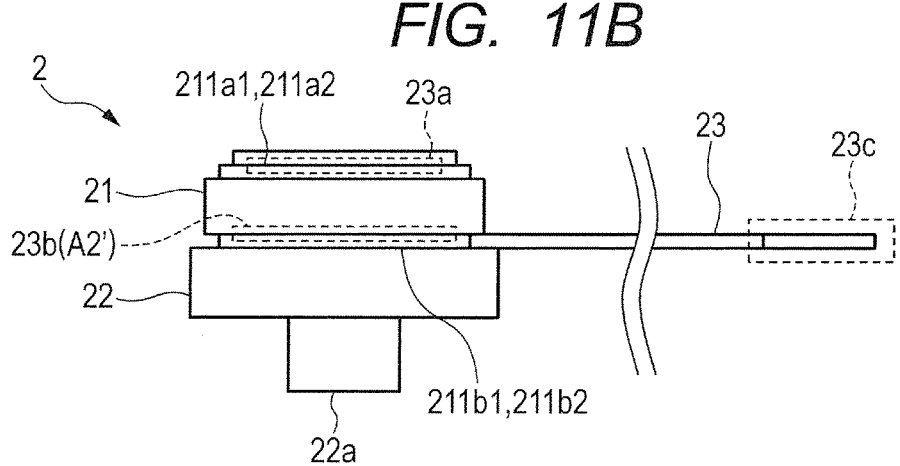
Figure 11C:
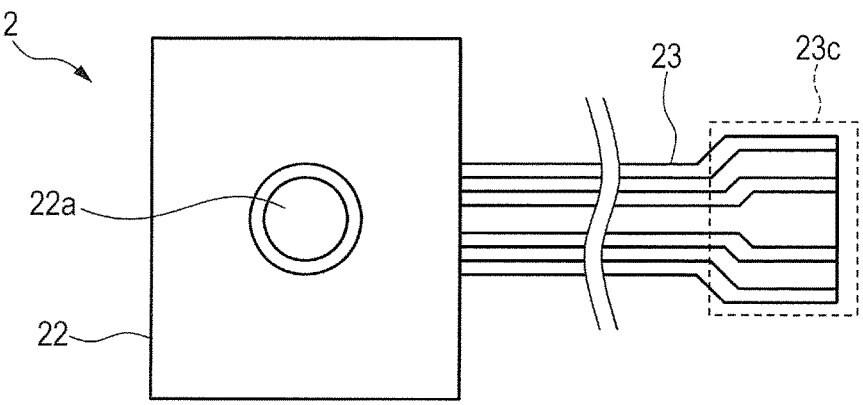

FIGS. 11A to 11C are a plan view, a front view, and a bottom view of the vibrator 2, respectively, and illustrate an example in which the second adhesive portion 23b is provided on the surface of the elastic member 22 in contact with the piezoelectric elements 21. In this example, out of the surfaces of the elastic member 22, the surface in contact with the piezoelectric elements 21 is partially covered with the piezoelectric elements 21. For this reason, an adhesion area A2' of the second adhesive portion 23b is smaller than the adhesion area A2 of the second adhesive portion 23b illustrated in FIG. 7C. To make the adhesion area A2' of the second adhesive portion 23b large, the second adhesive portion 23b of the conducting member 23 is preferably arranged on the surface opposite to the surface in contact with the piezoelectric elements 21 when viewed from the elastic member 22, as in the second embodiment.

Note that the present invention is not limited to the first and second embodiments. For example, the shapes of the piezoelectric element, the elastic member, and the conducting member are not limited to those described above. The number and positions of adhesive portions are not limited to those described above, either. Preferably, the adhesion area A2 of the second adhesive portion is larger than the adhesion area A1 of the first adhesive portion, the conducting member is a flexible substrate, the conducting member is conductive with the piezoelectric element via the first adhesive portion, and the conducting member is conductive with the piezoelectric element via the second adhesive portion. However, these are not always necessary. The effects of the present invention can be obtained if the length of the path that connects the feed portion and the first adhesive portion of the conducting member is longer than the length of the path that connects the feed portion and the second adhesive portion. Alternatively, the effects of the present invention can be obtained if the path from the feed portion to the first adhesive portion has at least one bending portion, and the path from the feed portion to the second adhesive portion is almost straight.

Note that arranging the second adhesive portion 23b between the feed portion 23c and the first adhesive portion 23a and arranging the second adhesive portion 23b of the conducting member 23 on the surface opposite to the surface in contact with the piezoelectric elements 21 when viewed from the elastic member 22, as in the vibrator 2, are not always necessary. Providing two or more piezoelectric elements in the vibrator is not always necessary.

The present invention is usable to, for example, drive a lens in the lens barrel of a camera that needs a small high-output motor.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-221176, filed Oct. 30, 2014, which is hereby incorporated by reference herein in its entirety.

What is claimed is:

1. A vibrator comprising:
a piezoelectric element including a plurality of electrodes and configured to expand and contract when a voltage is applied;
an elastic member having conductivity and configured to come into contact with the piezoelectric element and be vibrated by the expansion and contraction of the piezoelectric element; and
a conducting member configured to apply the voltage to the piezoelectric element from outside,
wherein the conducting member comprises:
at least one first adhesive portion adhered to an electrode;
at least one second adhesive portion adhered to the elastic member; and
a feed portion electrically connected to means for applying the external voltage,
wherein the second adhesive portion is arranged closer to the feed portion than any one of the first adhesive portions,
wherein an adhesion area of the second adhesive portion is larger than an adhesion area of the first adhesive portion, and
wherein a path length from the feed portion to the first adhesive portion is longer than a path length from the feed portion to the second adhesive portion.

2. A vibrator according to claim 1, wherein the second adhesive portion is arranged on a surface opposite to a surface in contact with the piezoelectric element when viewed from the elastic member.

3. A vibrator according to claim 1, wherein the conducting member comprises a flexible substrate.

4. A vibrator according to claim 3, wherein the piezoelectric element and the flexible substrate are conductive with each other via the first adhesive portion.

5. A vibrator according to claim 3, wherein the piezoelectric element and the flexible substrate are conductive with each other via the second adhesive portion.

6. A vibrator according to claim 1, wherein the second adhesive portion is arranged between the feed portion and the first adhesive portion.

7. A vibrator according to claim 1, wherein the piezoelectric element comprises at least two piezoelectric elements.

8. An ultrasonic motor comprising a vibrator, a driven member to be relatively driven by a vibration of the vibrator, and a press member configured to bring the vibrator into contact with the driven member,
the vibrator comprising:
a piezoelectric element including a plurality of electrodes and configured to expand and contract when a voltage is applied;
an elastic member having conductivity and configured to come into contact with the piezoelectric element and be vibrated by the expansion and contraction of the piezoelectric element; and
a conducting member configured to apply the voltage to the piezoelectric element from outside,
wherein the conducting member comprises:
at least one first adhesive portion adhered to an electrode;
at least one second adhesive portion adhered to the elastic member; and
a feed portion electrically connected to means for applying the external voltage,
wherein the second adhesive portion is arranged closer to the feed portion than any one of the first adhesive portions,
wherein an adhesion area of the second adhesive portion is larger than an adhesion area of the first adhesive portion, and
wherein a path length from the feed portion to the first adhesive portion is longer than a path length from the feed portion to the second adhesive portion.

9. A vibrator comprising:
a piezoelectric element including a plurality of electrodes and configured to expand and contract when a voltage is applied;
an elastic member having conductivity and configured to come into contact with the piezoelectric element and be vibrated by the expansion and contraction of the piezoelectric element; and
a conducting member configured to apply the voltage to the piezoelectric element from outside,
wherein the conducting member comprises:
at least one first adhesive portion adhered to an electrode;
at least one second adhesive portion adhered to the elastic member; and
a feed portion electrically connected to means for applying the external voltage,
wherein an adhesion area of the second adhesive portion is larger than an adhesion area of the first adhesive portion, and
wherein a path from the feed portion to the first adhesive portion has at least one bending portion, and a path from the feed portion to the second adhesive portion is substantially straight.

10. A vibrator according to claim 9, wherein the second adhesive portion is arranged on a surface opposite to a surface in contact with the piezoelectric element when viewed from the elastic member.

11. A vibrator according to claim 9, wherein the conducting member comprises a flexible substrate.

12. A vibrator according to claim 11, wherein the piezoelectric element and the flexible substrate are conductive with each other via the first adhesive portion.

13. A vibrator according to claim 11, wherein the piezoelectric element and the flexible substrate are conductive with each other via the second adhesive portion.

14. A vibrator according to claim 9, wherein the second adhesive portion is arranged between the feed portion and the first adhesive portion.

15. A vibrator according to claim 9, wherein the piezoelectric element comprises at least two piezoelectric elements.

16. An ultrasonic motor comprising a vibrator, a driven member to be relatively driven by a vibration of the vibrator, and a press member configured to bring the vibrator into contact with the driven member,
the vibrator comprising:
a piezoelectric element including a plurality of electrodes and configured to expand and contract when a voltage is applied;
an elastic member having conductivity and configured to come into contact with the piezoelectric element and be vibrated by the expansion and contraction of the piezoelectric element; and
a conducting member configured to apply the voltage to the piezoelectric element from outside,
wherein the conducting member comprises:
at least one first adhesive portion adhered to an electrode;

at least one second adhesive portion adhered to the elastic member; and a feed portion electrically connected to means for applying the external voltage, wherein an adhesion area of the second adhesive portion is larger than an adhesion area of the first adhesive portion, and wherein a path from the feed portion to the first adhesive portion has at least one bending portion, and a path from the feed portion to the second adhesive portion is substantially straight.

\* \* \* \* \*